United States Patent [19]
Miller et al.

[11] Patent Number: 6,045,310
[45] Date of Patent: Apr. 4, 2000

[54] COMPOSITE FASTENER FOR USE IN HIGH TEMPERATURE ENVIRONMENTS

[75] Inventors: Robert J. Miller, North Palm Beach; Mark E. Palusis, Jupiter, both of Fla.; David C. Jarmon, Kensington, Conn.

[73] Assignee: United Technologies Corporation, Hartford, Conn.

[21] Appl. No.: 09/165,913

[22] Filed: Oct. 2, 1998

Related U.S. Application Data

[60] Provisional application No. 60/061,164, Oct. 6, 1997.

[51] Int. Cl.⁷ ............................. F16B 35/02; F16B 35/04
[52] U.S. Cl. ..................... 411/383; 411/356; 411/901; 411/908
[58] Field of Search .................... 411/354, 383, 411/384, 356, 513, 514, 530, 901, 902, 908, 411

[56] References Cited

U.S. PATENT DOCUMENTS

| | | |
|---|---|---|
| 3,102,447 | 9/1963 | Gregory et al. |
| 3,584,667 | 6/1971 | Reiland ........................... 145/50 |
| 3,740,083 | 6/1973 | Zenhausern ..................... 287/20.3 |
| 3,921,496 | 11/1975 | Helderman . |
| 3,930,428 | 1/1976 | Hale ............................. 81/121 R |
| 4,126,338 | 11/1978 | Coel et al. ....................... 285/330 |
| 4,432,680 | 2/1984 | Molina ............................ 411/103 |
| 4,507,035 | 3/1985 | Monett ............................ 411/377 |
| 4,609,315 | 9/1986 | Briles ............................... 411/43 |
| 4,687,394 | 8/1987 | Berecz ......................... 411/901 X |
| 4,723,881 | 2/1988 | Duran ............................. 411/353 |
| 4,784,554 | 11/1988 | Break ............................ 411/383 |
| 4,789,283 | 12/1988 | Crawford ......................... 411/43 |
| 4,854,438 | 8/1989 | Weissenberger et al. ........ 192/107 R |
| 4,863,330 | 9/1989 | Olez et al. ...................... 411/424 |
| 4,975,014 | 12/1990 | Rufin et al. ................... 411/901 X |
| 5,011,353 | 4/1991 | Boyd .............................. 411/383 |
| 5,073,072 | 12/1991 | Parekh et al. .................... 411/354 |
| 5,090,857 | 2/1992 | Dunn .............................. 411/385 |
| 5,092,727 | 3/1992 | Moghe ............................ 411/411 |
| 5,098,240 | 3/1992 | Gapp et al. ..................... 411/424 |
| 5,153,978 | 10/1992 | Simmons .......................... 29/509 |
| 5,195,855 | 3/1993 | Atkinson et al. .................. 411/43 |
| 5,231,059 | 7/1993 | Leung et al. ..................... 501/12 |
| 5,252,016 | 10/1993 | Schmid et al. ................... 411/386 |
| 5,292,215 | 3/1994 | Roberts, III .................. 411/383 X |
| 5,382,125 | 1/1995 | Durr et al. ....................... 411/396 |
| 5,461,866 | 10/1995 | Sullivan et al. .................... 60/757 |
| 5,569,008 | 10/1996 | Chapkovich ..................... 411/383 |

*Primary Examiner*—Neill Wilson

[57] ABSTRACT

A fastener includes a composite body and a metal coupling attached to the body. The metal coupling includes an attachment structure to connect the fastener to an external structure.

An assembly of components includes a first metallic component having a first coefficient of thermal expansion, a second non-metallic component having a second coefficient of thermal expansion different from the first thermal expansion and having a groove that receives a fastener that extends between the groove and the second component, the fastener slidably engaging the groove to accommodate relative expansion between the components.

30 Claims, 7 Drawing Sheets

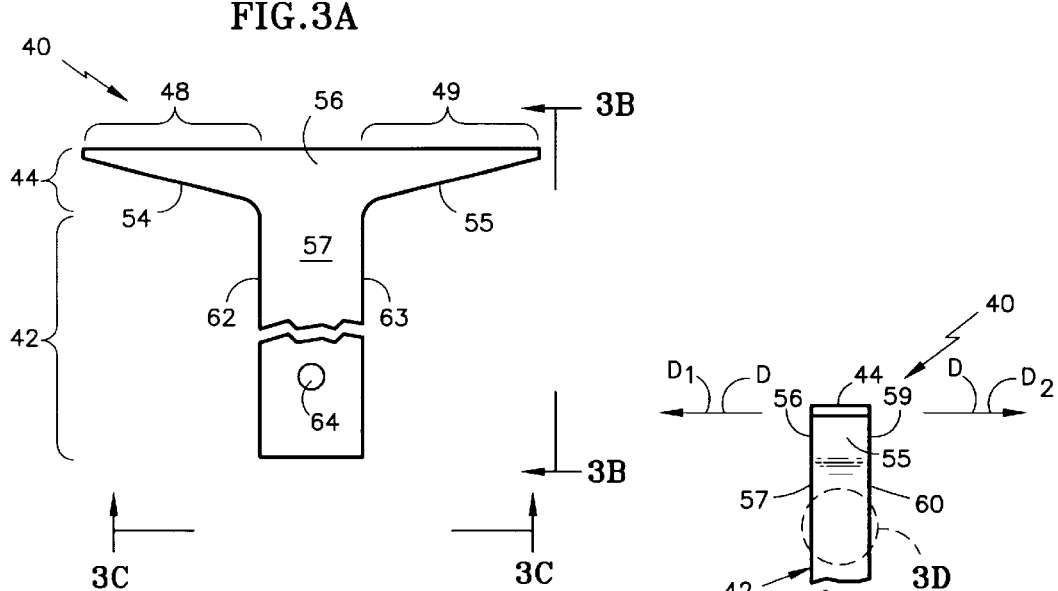
FIG.3A
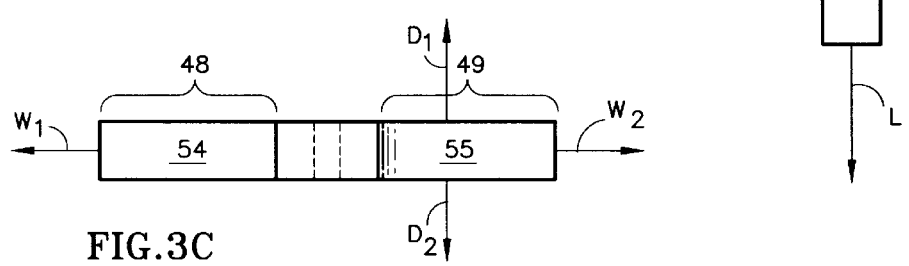
FIG.3C
FIG.3B
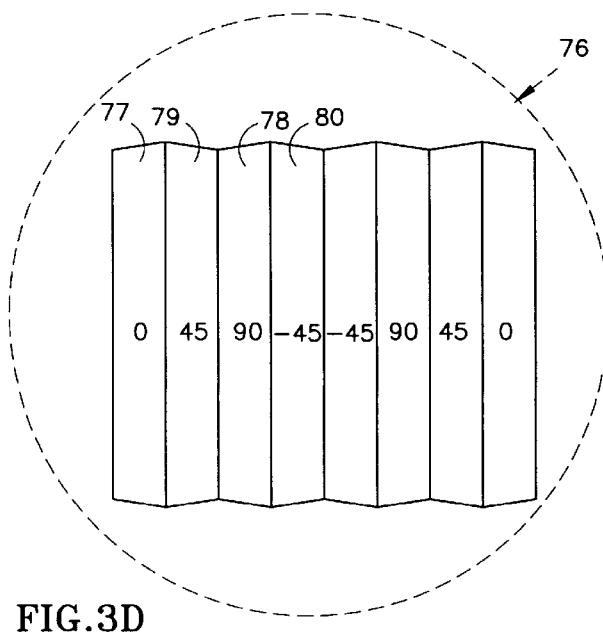
FIG.3D

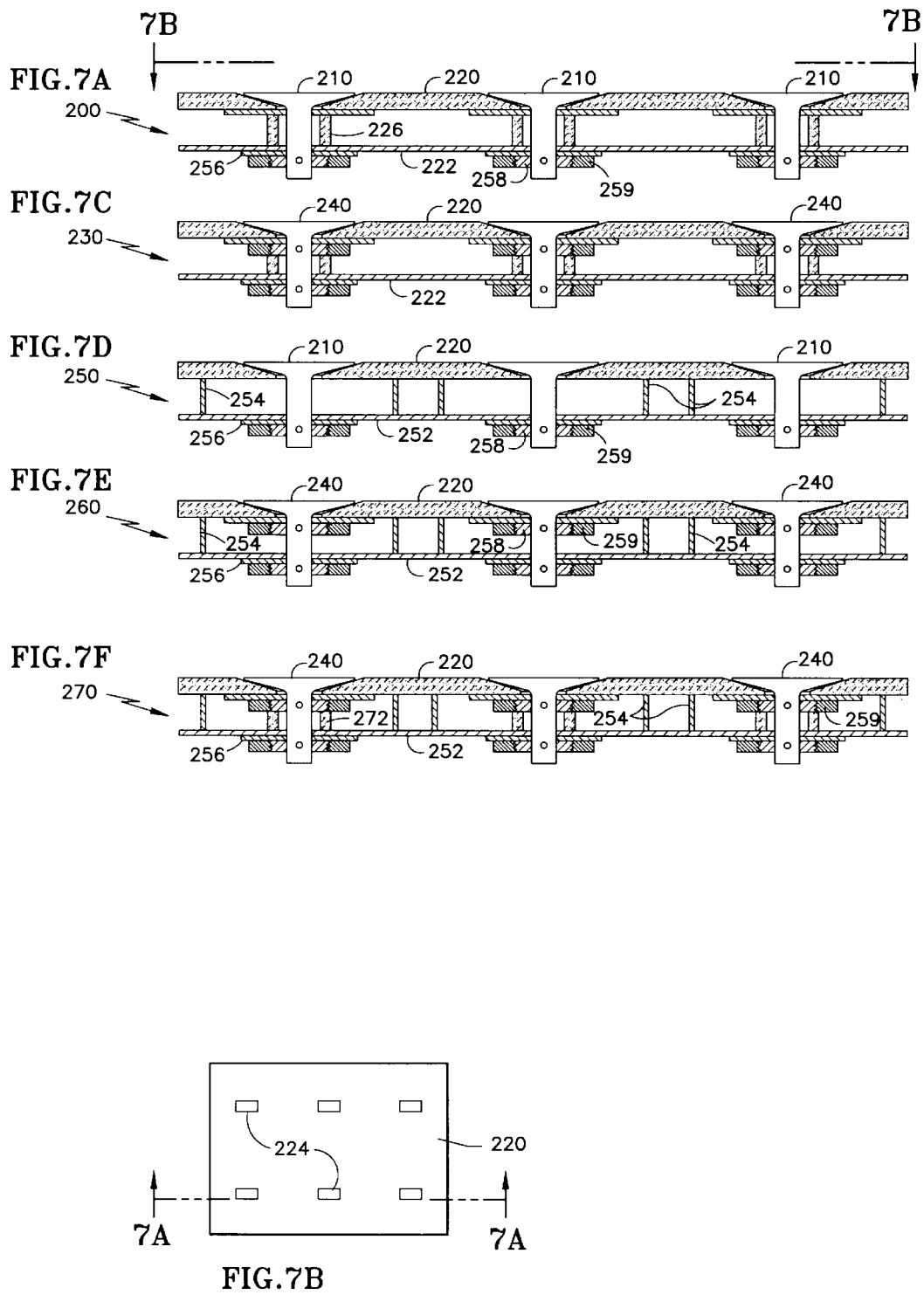

COMPOSITE FASTENER FOR USE IN HIGH TEMPERATURE ENVIRONMENTS

This application claims the benefit of U.S. Provisional Application No. 60/061,164, filed Oct. 6, 1997.

The government has rights in this invention pursuant to a NASA contract.

CROSS REFERENCE TO RELATED APPLICATION

The present application discloses subject matter common to the subject matter disclosed and/or claimed in related application entitled "FASTENER" filed on even date herewith.

TECHNICAL FIELD

The present invention is directed to fastening devices and more particularly to a composite fastener.

BACKGROUND OF THE INVENTION

Combustor and exhaust nozzle components on military and future hypersonic commercial engines require cooling to maintain the maximum component operating temperatures within the capabilities of metal structures. The requirement for cooling air reduces the engine performance. Ceramic materials, such as monolithic ceramics, offer potential for operation at the extreme temperatures these components would experience without cooling air. However, designers have had difficulties in the past utilizing monolithic ceramics in structural components due to low toughness and susceptibility to brittle fracture. Therefore, alternatives such as ceramic matrix composites and carbon matrix composites ("CMCs") have been developed to provide the toughness capabilities not achieved in monolithic ceramics.

Ceramic and carbon matrix composites are being actively pursued for structural applications in turbine engine nozzles. Typically, the composites are in the form of a laminate having a plurality of laminar layers joined by a matrix material. Each laminar layer has a plurality of fibers that provide the layer with strength. However, a major drawback to the application of these composites has been their weak inter-laminar strength (i.e., any strengths which are dependent on the matrix as opposed to the fibers). The fibers are typically several orders of magnitude stronger than the matrix, therefore, the preferred designs are those which minimize the stresses in the matrix. The lack of a high temperature fastener has complicated CMC's designs due to the requirement that the attachments occur in cooler regions where metal fasteners could survive.

One structural application in which composites have been pursued is that of a fastener. Composite fasteners such as composite bolts are attractive because they may be disposed in hotter regions than metal fasteners. A shortcoming in prior art composite bolts is the limited ability of the bolt to transfer load from the bolt head to the shank of the bolt where the load must be transmitted by shear. Another shortcoming of threaded composite bolts of the prior art is that the load is transferred from the nut to the bolt shank, again through shear in the threads. This shear load results in significant matrix or inter-laminar shear in the composite bolts and causes another weak link in CMC composites. Thus, although CMC materials can be threaded, the low inter-laminar strength of the materials precludes using threaded CMC fasteners in structural applications.

Accordingly, scientists and engineers working under the direction of Applicant's assignee have been working to provide a composite fastener for use in high temperature environments that can be used in combination with CMC's in structural applications.

SUMMARY OF THE INVENTION

Therefore, an object of the invention is to provide a fastener that effectively attaches a composite to a metal under structure.

Another object of the invention is to provide a fastener that can be converted to a threaded fastener without the limitations of previous threaded composite fasteners.

According to the present invention, a fastener includes a composite body and a metal coupling attached to the body.

According to the present invention an assembly of components includes a first component which is metal and has a coefficient of thermal expansion, a second component which is not metal and has a coefficient of thermal expansion different from that of the first component, the first component having a groove that receives at least one fastener that extends between the groove and the second component, the fastener slidably engaging the groove to accommodate relative expansion between the components.

The invention is advantageous in several respects. The new fastener provides a structure that enables loads to be transmitted to and from the composite body of the fastener in a way that utilizes the fiber dominated strength of the composite body while minimizing stresses on the matrix. In one embodiment, the metal coupling is a threaded metal sleeve permitting use in a manner typical of a bolted metal fastener.

These advantages and the features of the invention will become more apparent in light of the following description of the best mode of carrying out the invention and the accompanying drawings.

BRIEF DESCRIPTION OF THE DRAWINGS

A more complete understanding of the present invention and the attendant features and advantages thereof may be had by reference to the following detailed description of the invention when considered with the accompanying drawings.

FIG. 3A is a front view of the fastener of FIG. 2A.

FIG. 3B is a side view of the fastener of FIG. 2A.

FIG. 3C is a bottom view of the fastener of FIG. 2A.

FIG. 3D is a representation of fiber orientations in a portion of the fastener of FIG. 2A.

FIG. 7A is a view of a composite liner and a back-structure in combination with a side view of a plurality of fasteners similar to the fastener of FIG. 2A.

FIG. 7B is a view of the composite liner of FIG. 7A from the direction of 7B—7B in FIG. 7A.

FIG. 7C is a cross section view of the composite liner and back-structure of FIG. 7A in combination with a side view of a plurality of pre-assembled fasteners similar to the pre-assembled fastener of FIG. 4.

FIG. 7D is a cross section view of a composite liner and a back-structure having ribs, in combination with a side view of a plurality of fasteners similar to the fastener of FIG. 2A.

FIG. 7E is a cross section view of the composite liner and back-structure of FIG. 7D, in combination with a side view of a plurality of pre-assembled fasteners similar to the pre-assembled fastener of FIG. 4.

FIG. 7F is a cross section view of the composite liner and back-structure of FIG. 7D, in combination with a side view of a plurality of pre-assembled fasteners similar to the pre-assembled fastener of FIG. 4.

BEST MODE FOR CARRYING OUT THE INVENTION

Figure 1A:
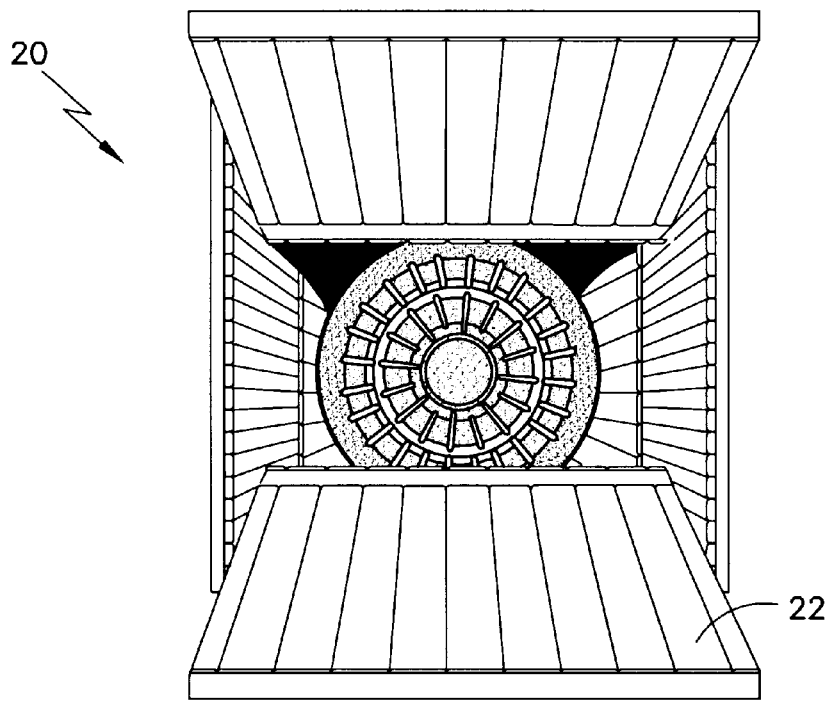
FIG. 1A is a view of a prior art exhaust nozzle for a gas turbine engine.
Figure 1B:
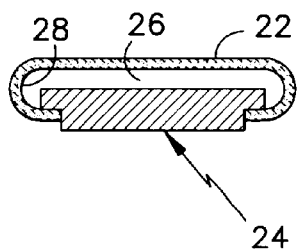
FIG. 1B is across section view of a prior art curled composite liner and a back-structure used in the exhaust nozzle of FIG. 1A.

Referring now to the drawings wherein like reference numerals identify corresponding or similar elements throughout the several views. FIGS. 1A and 1B show a rectangular exhaust nozzle 20 of the prior art for an augmented gas turbine engine. The nozzle incorporates high temperature curled composite (e.g., ceramic or carbon matrix composite) liners 22 to protect a metal back-structure 24 from a hot exhaust gas flow. Cooling air flows in a space 26 between the composite liners 22 and the metal back-structure 24 to maintain the metal temperature within its operational limits. However, out-of-plane distortion of the metal back-structure 24 can induce thermal stress in the composite liner 22. In addition, the cooling air flowing under the composite liners 22 subjects the liners to a significant pressure loading. The pressure load induces significant interlaminar tensile stress in a radius region 28 of the composite liner 22.

Figure 2A:
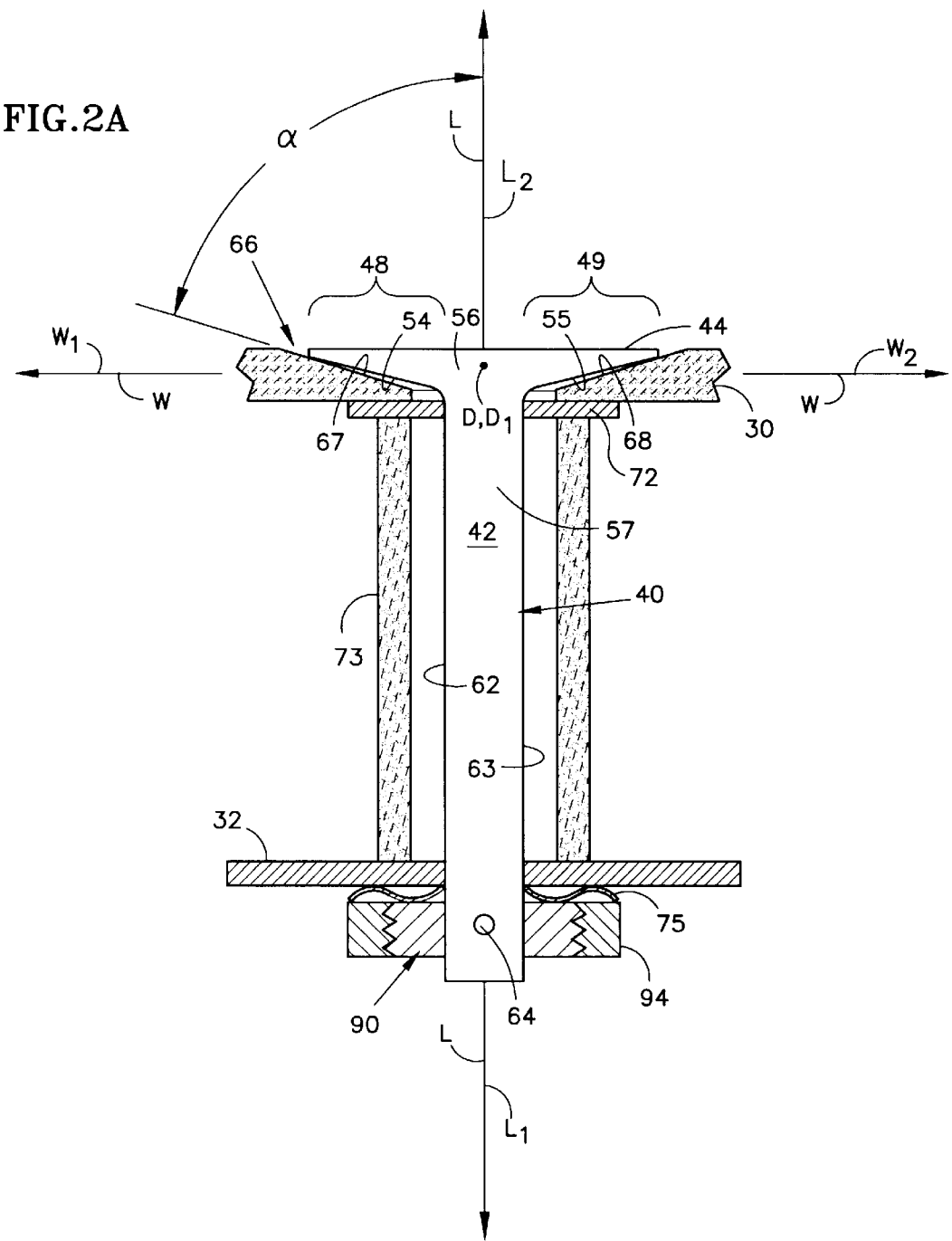
FIG. 2A is a cross section view of an alternative composite liner for use in the exhaust nozzle of FIG. 1A, in combination with a front view of a fastener according to the present invention, for attaching the liner to a back-structure.

FIG. 2A is a cross section view of a composite liner 30 that is an alternative to the liner 22 for use in the rectangular exhaust nozzle 20 of FIG. 1A. The composite liner is shown in combination with a front view of a fastener 40. The fastener attaches the liner 30 to a back-structure 32. Referring now to FIG. 2A, the alternative composite liner 30 is flat in that it does not have attachment arms such as those on the curled liner of FIG. 1A–1B. Rather, the composite liner 30 is attached to the metal back-structure by a plurality of fasteners, represented by the fastener 40. The fastener comprises a composite material, e.g., ceramic matrix composite or carbon/carbon composite material. The fastener has three mutually orthogonal reference axes for describing the fastener: a lengthwise axis L, a widthwise axis W, and a depthwise axis D. Each of these axes define opposite directions as represented by two opposite lengthwise directions $L_1$, $L_2$, two opposite widthwise directions $W_1$, $W_2$, and two opposite depthwise direction $D_1$, $D_2$ (FIGS. 3B, 3C). The two opposite widthwise directions $W_1$, $W_2$, are orthogonal to the lengthwise directions $L_1$, $L_2$. The two opposite depthwise direction $D_1$, $D_2$ (FIGS. 3B, 3C) are orthogonal to the lengthwise directions $L_1$, $L_2$ and the widthwise directions $W_1$, $W_2$.

The composite material comprises a plurality of fibers. As used herein, the term "fiber" may be an individual fiber or a plurality of fibers arranged in a tow. The fibers are oriented to provide strength in the principal load carrying directions. This enables the fastener to utilize the high in-plane fiber dominated strength of the composites to transmit the primary loads. The strength properties of composite materials are anisotropic in that they rely on fibers to provide the primary load carrying capability. In one orientation, the fibers extend and provide strength in directions parallel to a plane defined by the lengthwise and widthwise axes, and referred to herein as a plane of the fibers. In such orientation, the fastener has a l-w shear strength characteristic in directions substantially parallel to the plane defined by the widthwise and the lengthwise directions that is greater than at least one of a l-d shear strength characteristic in directions parallel to a plane containing the lengthwise and a depthwise direction and a w-d shear strength characteristic in directions parallel to a plane containing the widthwise and the depthwise directions. This orientation helps to increase the load carrying capability of the fastener in regard to loads in directions parallel to the lengthwise and the widthwise directions. Note, however, that the fibers can effectively provide strength in a direction without having the fibers oriented to extend perfectly parallel to the direction. Furthermore, other fiber orientations may be employed but will not have the level of load carrying capability of this structure.

The fastener 40 has a shank 42 and a head 44. The shank and the head are integral with one another. As used herein integral means that they are one piece or act as one piece. The shank 42 extends in a lengthwise direction $L_1$ away from the head 44. The head 44 has a first extension 48 and a second extension 49. The first extension 48 extends beyond the shank 42 in one of the widthwise directions $W_1$. The first extension has a load surface 54 to receive a load. The second extension 49 extends beyond the shank 42 in the other of the widthwise directions $W_2$. The second extension has a load surface 55 to receive a load. The load surfaces 54, 55 are angled (at an angle α, i.e., not orthogonal) in relation to the lengthwise directions $L_1$, $L_2$ to facilitate efficient transfer of loads to and from the liner 30.

FIGS. 3A–3C are respectively front, side, and bottom views of the fastener 40 of FIG. 2A. FIG. 3D is an enlarged view of a portion of the side view (FIG. 3B). FIG. 3D shows in more detail the fiber orientation of the fastener 40. Referring now to FIGS. 3A–3D, in one embodiment, the fastener 40 is machined from a flat laminate 76 (FIG. 3D) having reinforcing fibers in a quasi-isotropic orientation, referred to herein as a quasi-isotropic laminate. The quasi-isotropic laminate has extensional stiffness coefficients of elasticity that are independent of direction in the plane of the laminate. The strength characteristics are approximately independent of direction in the plane of the laminate. Such a laminate form results in a reasonably strong fastener, helps to reduce the cost of manufacture, and facilitates inspection of the fastener.

In addition, quasi-isotropic lay-ups have been extensively studied and characterized. In one embodiment, the quasi-isotropic laminate 76 incorporate plies 77, 78, 79, 80 having 0/90/45/−45 degree fiber orientations respectively, typically with equal percentages of each fiber orientation. Such a lay-up can be readily achieved from balanced fabric using equal numbers of layers oriented at 0, +45, −45 and 90 degrees.

Referring now to FIGS. 3A, the head 44 has a first depthwise (facing) side 56. The shank 42 has a first depthwise (facing) side 57. As shown in FIG. 3B, the head 44 has a second depthwise (facing) side 59. As shown in FIGS. 2A, 3A, the shank 42 has a second depthwise (facing) side 60. The shank has a first widthwise (facing) side 62 and a second widthwise (facing) side 63. The two widthwise sides 62, 63 are planar and parallel to each other, which simplifies fabrication and use of the fastener 40. In some embodiments, one or more edges of the fastener 40 are chamfered and the sides may not be planar and parallel to each other.

As shown in FIG. 2A, the shank has a peripheral engagement surface having a recess 64 therethrough to receive an attachment structure. The recess 64 extends in a direction perpendicular to the plane of the fibers and thus takes advantage of the strength of the quasi-isotropic laminate. In one embodiment, the attachment structure is a pin 65 (FIG. 2B) that extends into the recess 64. The pin 65 transmits load to and from the shank 42. Shear loads transmitted to the shank are converted into tension and compression in the +45 degree and minus 45 degree fibers. Note that composite lap joints often transfer loads through a pin in a quasi-isotropic laminate. In another embodiment (not shown), one end of the pin has a flange and the other end extends through the recess 64. In the latter embodiment, the attachment structure may further include a washer that slides over the extended end, and a nut (or alternatively a cotter pin) that attaches to the extended end to complete the structure.

Referring again now to FIG. 2A, the liner has a slot 66 that receives the fastener 40. The liner 30 has a first load surface 67 and a second load surface 68 on opposite sides of the slot 66. The first load surface 67 contacts and transmits load to the load surface 54 of the first extension 48 of the fastener head 44. The second load surface 68 contacts and transmits load to the load surface 55 of the second extension 49 of the fastener head 44. The load surfaces 67, 68 of the liner 30 may be contoured complementary to the fastener 40 load surfaces 54, 55 that they contact. The liner 30 may also have surfaces, represented by a surface 69 (FIG. 8), that face and provide an interference against rotation in combination with the first and the second depthwise sides 56, 59 (FIGS. 3B, 3C) of the head 44 of the fastener 40. The interference may in effect prevent rotation of the fastener 40, although this is not required. The interference does not result in transmission of significant lengthwise directed L loads into the head 44 of the fastener 40.

The fastener 40 may further pass through a washer 72, which supports the liner 30, and a ceramic spacer 73, which may be of a monolithic ceramic material and which sets the spacing between the liner 30 and metal back-structure 32. As shown in FIGS. 7D–7F, alternative approaches for separating the liner 30 from the back-structure 32 might include honeycomb structure or a ribbed back-structure to support the liner and carry compressive loads. These are described in further detail below with respect to FIGS. 7D–7F. After the liner 30 is in place, a washer (e.g., conventional or Bellville) or spring 75 is applied and an attachment structure is inserted into the recess 64.

Loads transmitted from the liner 30 to the head 44 of the fastener 40 are primarily transmitted through the load surface 54 on the first extension 48 of the head and the load surface 55 on the second extension 49 of the head, rather than through any of the other exterior surfaces on the head. This method of transmitting load takes advantage of the strength of the fibers in the composite material of the fastener 40. The loads transmitted from the liner to the fastener may have a component directed in a direction parallel to the lengthwise directions, referred to herein as a lengthwise directed load. In one embodiment, substantially all lengthwise directed load components transmitted from the liner to the head are transmitted through the extension. As used herein substantially all lengthwise directed load components means at least 95% percent of all lengthwise directed load components. In addition this method of transmitting load helps to reduce the level of shear stress on the matrix within the composite. Non lengthwise directed load components transmitted from the liner to the head need not all be transmitted through the extensions of the head.

The first depthwise side 56 of the head and the first depthwise side 57 of the shank are coplanar with each other. In addition, the second depthwise side 59 (FIG. 3B) of the head and the second depthwise side 60 (FIG. 3B) of the shank are coplanar with each other. Making the sides coplanar helps to simplify fabrication and inspection of the fastener 40. Making the sides coplanar also helps to prevent introduction of significant shear stress into the head 44 through the first depthwise side 56 of the head and the second depthwise side 59 of the head. Such stresses can result in significant shear stresses on the matrix in the composite material. In one embodiment, the two first depthwise sides 56, 57 of the head and the shank are parallel with the two second depthwise sides 59, 60 of the head and the shank. This further simplifies fabrication and helps to further minimize introduction of significant shear stress into the matrix of the composite material of the head.

In the event that the first two 56, 57 or the second two 59, 60 depthwise sides are not coplanar, it is even more important to take measures to minimize introduction of shear stress through these sides of the head 44. For example, the head may have a jut portion that overhangs the shank in a depthwise direction. The jut portion is typically not be capable of sustaining as much shear force as that of the non jutting portion of the head. However, the load surfaces of the extensions may extend in a depthwise direction beyond the depthwise sides of the shank, i.e., onto the jut. So long as the load is applied somewhat evenly through the load surface, the portion of the load surface associated with the non jutting portion of the head limits the magnitude of any shear strain introduced into the portion of the load surface associated with the jutting portion of the head.

The load transfer by shear from the fastener head to the fastener shank is carried by the +45 degree plies 79 and 45 degree plies 80. The 0-degree plies 77 along the lengthwise direction L of the shank 42 provide the primary load carrying capability from the liner to the back-structure. The 90-degree plies 78 resist the bending stresses induced in the fastener head 44. Inter-laminar stresses are minimized. The load is transferred from the fastener 40 to the back-structure 32 (FIG. 2A) through the pin 65 (FIG. 2B) inserted in the recess 64 (FIG. 2A) of the shank 42.

Figure 2B:
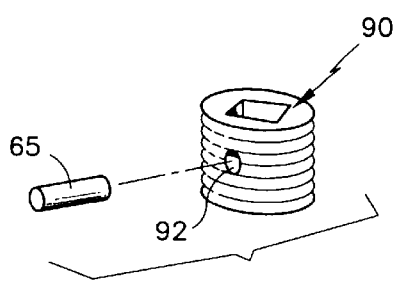
FIG. 2B is a perspective view of a metal sleeve and a pin that may be used with the fastener of FIG. 2A.

As shown in FIGS. 2A and 2B, the composite fastener 40 may include a metal coupling 90 attachment structure. The metal coupling 90 is a metal sleeve with threads on an external surface to engage an externally threaded device, although the metal coupling may have any type of alternative attachment structure to engage an adjacent structure. The addition of the threaded metal sleeve 90 converts the fastener to a threaded fastener without the limitations of previous threaded composite fasteners. The threaded metal sleeve has a bore that receives the peripheral engagement surface of the sleeve. The threaded metal sleeve 90 is mechanically attached to the composite by the metal pin 65, which extends through an aperture 92 in the sleeve 90 and into the recess 64 of the shank 42. The pin transmits load to and from the shank 42. Shear loads transmitted to the shank are converted into tension and compression in the +45 degree and minus 45 degree fibers. A conventional nut 94 is screwed over the sleeve 90 to complete the structure.

Figure 4:
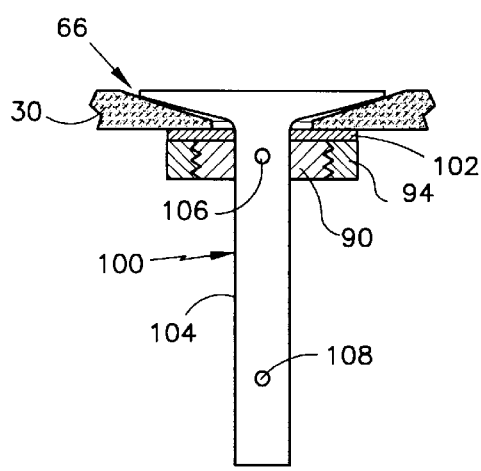
FIG. 4 is a view of a fastener pre-assembled to the liner.

FIG. 4 shows a composite fastener 100 similar to the fastener 40 (FIGS. 2A). The fastener is pre-assembled to the composite liner 30 (or a panel or face sheet). The assembly steps are: 1) insert the fastener 100 into the liner 30; 2) slide a washer 102 over the shank 104 of the fastener 100; 3) slide the threaded metal sleeve 90 over the shank 104 of the fastener 100; 4) align the aperture 92 (FIG. 2B) in the threaded metal sleeve 90 with a recess 106 in the fastener 100 and insert the pin 65 until it is flush with the base of the threads on the sleeve 90; 5) apply the nut 94 and torque to a predetermined load. The desired amount of pre-load will depend on factors such as design application and material system. For example, it may be desired to increase the pre-load to increase the inter-laminar shear and inter-laminar tension capabilities of the material system for a particular design, but the effects of the pre-load on the thermal and mechanically induced loads must be accounted for in the finite element thermo-structural analysis. Pre-assembly of fasteners is not required for all applications.

Figure 5A:
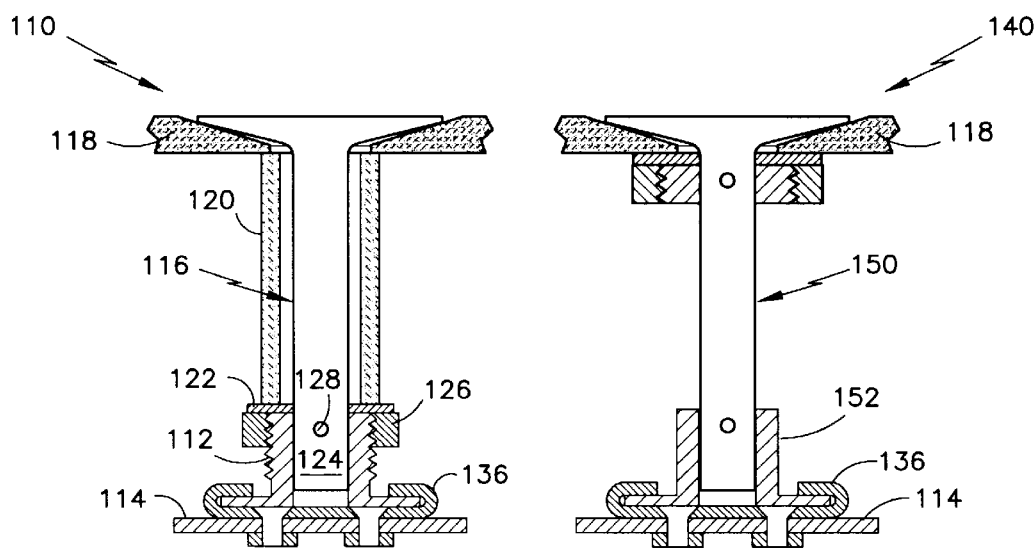
FIG. 5 is a view similar to that of FIG. 2A describing two additional attachment techniques.
Figure 5B:
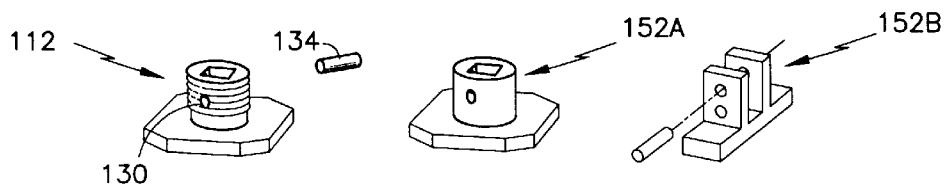

Other embodiments for attaching composite fasteners of the present invention are illustrated in FIGS. 5A and 5B. One embodiment 110 includes a metal coupling 112 that may be a threaded metal sleeve with a flange (i.e., a threaded metal "T" sleeve) that is pre-assembled to the liner. The assembly steps are: 1) insert a fastener 116 into a liner (or a panel or face sheet) 118; 2) slide a ceramic spacer 120 and a washer 122 over the shank 124 of the fastener 116; 3) thread a nut 126 onto the threaded metal sleeve 112 until it touches the bottom of the "T"; 4) slide the threaded metal "T" sleeve 112 over the shank 124 of the fasteners 116; 5) align a recess 128 in the fastener 116 and an aperture 130 (FIG. 5B) in the threaded metal sleeve 112 and insert a pin 134 until it is flush with the base of the threads on the sleeve 112; 6) torque the nut 126 to a predetermined load.

Local channels 136 are attached to the back-structure 114 to provide a groove of a "tongue-in-groove" thermally free attachment track. A thermally free attachment facilitates thermally free in-plane growth. The "T tongues" are aligned with the grooves and the liner assembly is slid forward to engage the attachment channels 136. The edge gap between the "T tongue" and the channel grooves is determined by the thermal growth differential between the liner assembly and the back-structure. The radial gaps are generally determined by the assembly requirements. A design variation permits the use of leaf spring inserts (not shown) in the channels 136 to keep the assembly tight and provide acoustic damping. Since the liners operate at elevated temperatures, the difference in the thermal bowing of the liners 118 and back-structure 114 will generally maintain a tight fit between the "T" and channels 136 to prevent chattering. In some designs, it may be desirable to provide additional radial gap to relieve thermal stresses from out-of-plane thermal bowing.

Another embodiment 140 provides a similar thermally free attachment, but the pre-assembly procedure differs. A fastener 150 is pre-assembled to the liner 118 as described previously. A metal coupling 152 is pinned (bolted or riveted) to the fastener 150 after the fastener 150 is pre-assembled to the liner 118. The metal coupling 152 may be a non-threaded metal "T" sleeve 152A (FIG. 5B) or a "T" clevis 152B (FIG. 5B). If a clevis is used, two pins should be inserted to prevent rotation. In this embodiment 140, the fastener 150 carries compressive, as well as tensile load.

Figure 6:
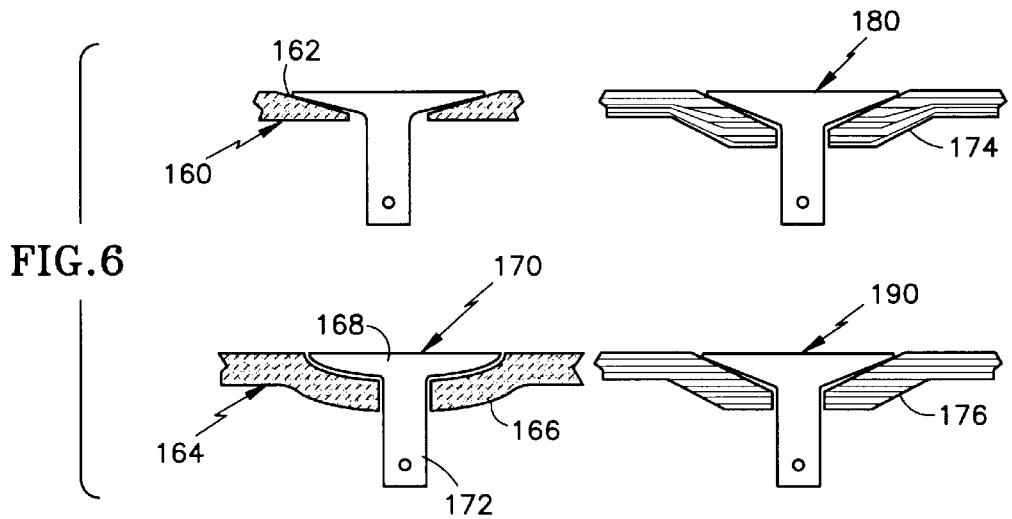
FIG. 6 is a view of four flat liner designs.

Examples of liner or panel lay-up in the region of a fastener attachment are illustrated in FIG. 6. The simplest example is the fabrication of a flat laminated panel 160 with a fastener slot 162 machined in the flat laminate 160. Another approach is illustrated where a flat panel 164 is locally dimpled 166 during fabrication to accommodate a head 168 of a fastener 170 and a rectangular hole is machined to accommodate the shank 172 of the fastener 170. The other approaches illustrate local buildups 174, 176 in regions of fasteners 180, 190 respectively. The interspersed 174 is the preferred analytical approach although the non-dispersed 176 simplifies fabrication.

Referring now to FIGS. 7A and 7B, another embodiment 200 has a plurality of fasteners 210 that attach a liner 220 to a back-structure 222. The liner 220 has a plurality of slots or cutouts 224 for the plurality of fasteners 210. This embodiment has all the slots 224 oriented in the same direction. However, the slots 224 may have any desired orientation, including but not limited to individual optimization of each slot angle. For example, in some embodiments the liner may produce multi-directional horizontal shear loads. In such embodiments, it may be desirable to provide slots at various direction orientations so as to orient the fasteners at various directions, thereby better orienting the fasteners to resist the multidirectional horizontal shear loads.

The plurality of fasteners may be attached to the liner and the back-structure using, for example, any of the attachments described above and/or combinations thereof. In this embodiment 200, ceramic spacers 226 support the liner 220 and the plurality of fasteners 210 are attached to the liner 220 and the back-structure 222 in a manner similar to that described above with respect to FIGS. 2A and 2B. Referring now to FIG. 7C, in another embodiment 230 a plurality of fasteners 240 are pre-assembled to the liner 220 in a manner similar to that described above with respect to FIG. 4. Referring now to FIG. 7D, in another embodiment 250 a back-structure 252 has ribs 254 and the liner 220 is supported by the ribs 254 rather than by ceramic spacers 226 (FIG. 7A). Thus, the ribs 254, rather than ceramic spacers, carry the compressive load. The fasteners 210 are inserted through the liner 220 and the back-structure 252. Washers 256, threaded sleeves 258 and nuts 259 are then applied. Referring now to FIG. 7E, in another embodiment 260 the back-structure 252 has ribs 254, described with respect to FIG. 7D, and the fasteners 240 are pre-assembled to the liner 220 in a manner similar to that described above with respect to FIGS. 4 and 7C. Referring now to FIG. 7F, in another embodiment 270, a ribbed 254 back-structure 252 and spacers 272 (e.g., cylinder or spring) are used in combination to provide support for the liner 220.

Figure 8:
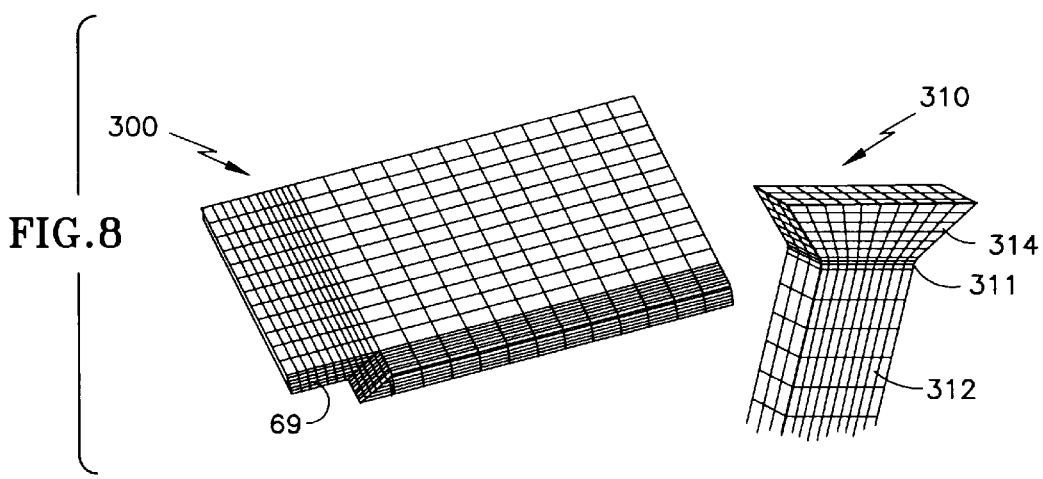
FIG. 8 is a finite element representation of a fastener in combination with a finite element representation of a liner.

Referring now to FIG. 8, finite element representations 300, 310 of a liner and a fastener respectively, may be used to analyze the design of the fastener and the liner in regard to thermal and structural perspectives. In addition, the representations 300, 310 may be used to optimize the designs for acoustic and thermal loading. Finite element models may also be used to analyze the stress in the fastener in regard to boundary conditions and manufacturing tolerances. In this embodiment, a very steep gradient may occur in a radius region 311 at an intersection of the fastener shank 312 and head 314. Consequently, it is necessary to apply a failure criterion such as the Whitney-Nuismer Criterion (which uses the stress at a characteristic distance $r_o$ from the edge to predict failure) if it is desired to predict failure loads comparable to that determined experimentally. Fastener failure at a pin region (not shown) may also be predicted using the Whitney-Nuismer Failure Criterion along with the finite element analysis.

Analysis indicates that to achieve an optimum design for handling loads, equal numbers of fibers should be oriented at 90, +45, and −45 degrees and the 0 degree direction requires approximately twice as many fibers as either of the other directions. Thus, the 0/90/+45/−45 quasi-isotropic lay-up does not represent an optimum design for handling loads. One skilled in the art may find that tape laminates could be used to achieve the optimum design by providing a larger percentage of fibers oriented at 0 degree.

Figure 9:
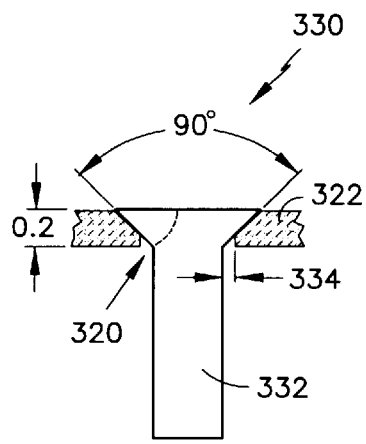
FIG. 9 is a cross section view of a composite liner in combination with a side view of a fastener.

Referring now to FIG. 9, it is typically desirable to have a gap 320 between a composite panel 322 and a fastener 330 shank 332. However, the load handling capability of the fastener may depend on the gap distance 334. For example, in one embodiment, the fastener withstands a greater load if the gap distance 334 is 0.012 inches than if the gap distance 334 is 0.027 inches.

Pre-compressing a fastener to a panel may have an insignificant effect on the load carrying capability of the fastener. For example, an embodiment having a fastener pre-assembled to the panel with a torque of 60 in-lbs. on the pre-assembly retaining nut and having a gap distance 334 of 0.013 inches demonstrates a slightly lower load handling capability than that of the embodiment described above having a gap distance 334 of 0.012 inch.

Figure 10:
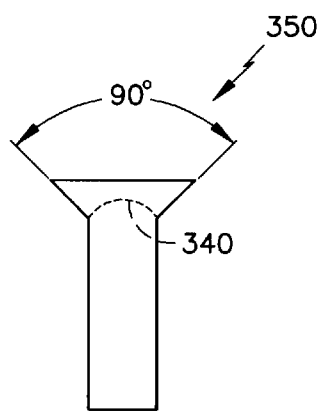
FIG. 10 is a side view of a fastener.

Referring now to FIG. 10, a dotted line 340 depicts a desired tensile failure mode of a CMC fastener 350 fabricated from quasi-isotropic laminates having fibers oriented at 0, 90, 45, −45 angles. This failure mode differs from the standard shear failure mode observed in the heads of standard composite bolts. The 45 degree fibers in the quasi-isotopic laminated fastener prevent the occurrence of the standard composite bolt shear failure mode. In one embodiment, a fastener having a thickness of 0.20 inches, a shank width of 0.375 inches, and a head cut at 45 degrees demonstrates a load carrying capability exceeding 1000 lbs.

Figure 11:
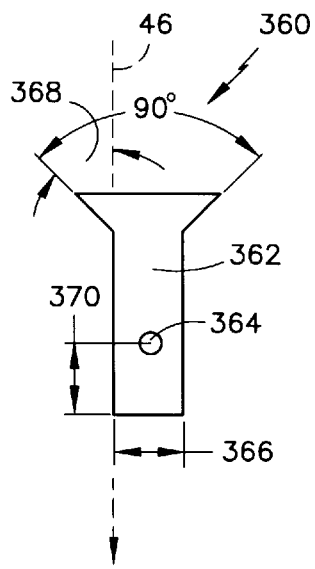
FIG. 11 is a side view of a fastener.

Referring now to FIG. 11, the tensile strength of a fastener 360 having a shank 362 with a recess 364 depends on the size and the location of the recess 364. In one embodiment, a fastener having a thickness of 0.20 inches, a shank width 366 of 0.375 inches, a head cut at an angle 368 of 45 degrees, and a recess 364 with a diameter of 0.130 inch diameter located a distance 370 of 0.375 inches from the lengthwise end of the shank 362, has a tensile strength approaching that of fasteners not having a recess. For such an embodiment, the load at which the head fails is approximately equal to the load at which the pin fails. Such an embodiment is an example of a balanced fastener design.

Figure 12:
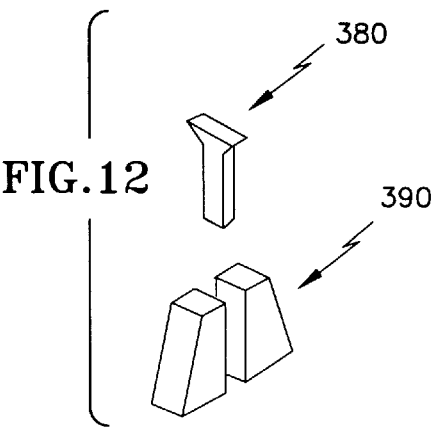
FIG. 12 is a perspective view of a fastener and an articulated wedge grip.

Referring now to FIG. 12, while a preferred embodiment of the shank includes a recess for use in attaching the fastener to the back-structure, the shank of a fastener 380 could alternatively be attached to the back-structure by way of a grip 390, e.g., a wedge grip (which may be articulated) or a mechanical grip (not shown), similar to those commonly used in tensile test machines.

Although described above as comprising a ceramic matrix or carbon matrix composite for a high temperature application, the fastener could comprise any composite material, including but not limited to any fiber reinforced matrix having carbon, graphite, glass, ceramic, aromatic polyamide fiber or polymer fibers and carbon, graphite, glass, ceramic or polymer (e.g., resin) matrix, or blends thereof. A common structural composite used in aerospace comprises a carbon or graphite fiber and a polymer matrix. In applications requiring a low dielectric constant, the fastener may be made of a composite comprising a low dielectric matrix and a low dielectric fiber. One example of a low dielectric composite is a fiberglass composite comprised of a polymer matrix and a glass or quartz fiber. Two types of glass fibers are S glass and E glass. The ceramic composites usually are a ceramic fiber reinforced ceramic matrix. The carbon matrix composites typically are a carbon fiber reinforced carbon matrix.

Although the best mode embodiment is described with respect to a fastener having the form of a laminate having woven plies with fibers oriented in planes parallel to the plane of the lengthwise and widthwise axes, the present invention is not limited to such. For example, the fastener may comprise fibers having the form of tapes, fabrics, woven mats, non-woven mats, continuous strands or chopped strands. Other forms of fibers include but are not limited to specialty mats and weaves, cross-ply biaxial, triaxial and quasi-axial assemblies, and three dimensional, braided, woven, or stitched preforms.

Furthermore, the depthwise facing sides of the head and the shank need only face in directions substantially parallel to the depthwise directions. In addition, the widthwise facing sides need not face in directions parallel to the widthwise directions. For example, the widthwise facing sides may be angled to converge toward each other, thereby resulting in a shank with a tapered width. Furthermore, in some embodiments, one or more of the edges of the fastener may be chamfered, beveled, or radiused.

The peripheral engagement surface of the sleeve can vary widely and typically is a polygonal shaped surface. Often, the peripheral engagement surface is rectangular, square or diamond shaped. The fastener body may have coatings thereon, including but not limited to a wear coating or a protective coating such as an oxidation resistant coating comprising for example a ceramic material.

Resinous matrices can vary widely. Often, they can be conventional polymer matrices such as epoxy, bismaleide, polyimide, phenolic or polyester resins and the like. One resinous matrix material that may for example be utilized is polyetheretherketone (PEEK), a semi-crystalline thermoplastic that has a melting temperature of approximately 650° F.

While the present invention has been described with reference to a best mode embodiment, this description is not meant to be construed in a limiting sense. Various modifications of the best mode of embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

We claim:

1. A fastener comprising:
   a body fabricated as a unitary component from a composite, the body including a head and a shank, the shank including a peripheral engagement surface and a recess, the shank having a first side and a second side extending lengthwise; and
   a metal coupling mechanically retained to the peripheral engagement surface of the shank and having an attachment structure for external engagement.

2. The fastener of claim 1 wherein the attachment structure is a threaded external surface.

3. The fastener according to claim 2 further comprising a nut screwed onto the threaded external surface of the metal coupling and encircling an aperture formed in the metal coupling.

4. The fastener according to claim 2 further comprising a nut that is screwed onto the threaded external surface of the metal coupling and retains the pin in a recess of the shank.

5. The fastener of claim 1 further comprising a second metal coupling that receives the shank and has an attachment structure.

6. A metallic threaded composite fastener for use in high temperature environments of hypersonic gas turbine engines comprising:

a fastener body fabricated as a unitary component from a composite having a low dielectric constant, the fastener body including a head, the head including a torque input surface for applying torque to engage and disengage the fastener, and a shank below the head, the shank including a peripheral engagement surface;

a unitary metallic sleeve having an externally threaded surface and an integration bore that is complementary to the peripheral engagement surface of the shank; and an elongated metallic pin wherein the sleeve has an aperture therethrough, the shank has a recess therein, the aperture is adjacent the recess and the pin engages the aperture and recess to preclude rotation between the sleeve and the fastener body.

7. A metallic threaded composite fastener for use in high temperature environments of hypersonic gas turbine engines comprising:

a fastener body fabricated as a unitary component from a composite having a low dielectric constant, the fastener body including a head, the head including a torque input surface for applying torque to engage and disengage the fastener, and a shank below the head, the shank including a peripheral engagement surface; and a unitary metallic sleeve having an externally threaded surface and an integration bore that is complementary to the peripheral engagement surface of the shank, wherein the integration bore mechanically engages the peripheral engagement surface of the shank to preclude relative rotation between the unitary metallic sleeve and the fastener body.

8. A metallic threaded composite fastener for use in high temperature environments of hypersonic gas turbine engines comprising:

a fastener body fabricated as a unitary component from a composite having a low dielectric constant, the fastener body including a head, the head including a torque input surface for apply torque to engage and disengage the fastener, and a shank below the head, the shank including a peripheral engagement surface; and a unitary metallic sleeve having an externally threaded surface and an integration bore that is complementary to the peripheral engagement surface of the shank, wherein the integration bore mechanically engages the peripheral engagement surface of the shank to preclude relative rotation between the unitary metallic sleeve and the fastener body; and an elongated metallic pin wherein the sleeve has an aperture therethrough, the shank has a recess therein, the aperture is adjacent the recess and the pin engages the aperture and recess to preclude rotation between the sleeve and the fastener body.

9. A fastener according to claim 8 wherein the composite of the fastener body is made from high temperature resistant ceramic composite, carbon matrix composites, fiberglass composites, aromatic polyamide fiber composites or blends thereof.

10. A fastener according to claim 8 wherein the fastener body is machined from high temperature resistant, flat laminates of fiber reinforced composites.

11. A fastener according to claim 10 wherein the laminates of the fastener body have a plane and the plane has fibers oriented in different load carrying directions.

12. A fastener according to claim 11 wherein the fibers of the laminates are oriented in 0°/90°/45°/−45° orientations.

13. A fastener according to claim 9 wherein the ceramic composite is a ceramic fiber reinforced ceramic matrix.

14. A fastener according to claim 9 wherein the carbon matrix composite is a carbon fiber reinforced carbon matrix.

15. A fastener according to claim 9 wherein the fiberglass composite is a magnesia aluminosilicate glass fiber reinforced resinous matrix.

16. A fastener according to claim 10 wherein the fibers are in the form of fabrics, woven mats, non-woven mats, continuous strands or chopped strands.

17. A fastener according to claim 10 wherein the flat laminates are filament wound, laminates.

18. A fastener according to claim 8 wherein the peripheral engagement surface is a polygonal shaped surface.

19. A fastener according to claim 8 wherein the peripheral engagement surface is rectangular, square or diamond shaped.

20. A fastener according to claim 8 wherein the fastener body has an oxidation resistant coating thereon.

21. A fastener according to claim 20 wherein the coating is a ceramic material.

22. A fastener according to claim 8 wherein the metallic sleeve and metallic pin are made of a metal alloy.

23. An arrangement comprising:

a first component constructed of metal and having a first coefficient of thermal expansion, the first component having a groove;

a second component constructed of a non-metal and having a second coefficient of thermal expansion different from the first coefficient of thermal expansion; and at least one fastener including a body fabricated as a unitary component from a composite, the body including a head and a shank, the shank including a peripheral engagement surface and a recess, the fastener further including a metal coupling mechanically retained to the peripheral engagement surface of the shank and having an attachment structure for external engagement, wherein the fastener extends between the groove and the second component.

24. A composite component according to claim 23 wherein the fastener is free to slide in the groove.

25. A composite component according to claim 23 wherein the fastener body is high temperature resistant ceramic composites, carbon matrix composites, fiberglass composites, aromatic polyamide fiber composites or blends thereof.

26. A composite component according to claim 23 wherein the fastener body is machined from high temperature resistant, flat laminates of fiber reinforced composites.

27. A fastener comprising:

a body fabricated as a unitary component from a composite, the body including a head and a shank, the shank including a peripheral engagement surface and a recess;

a metal coupling mechanically retained to the peripheral engagement surface of the shank and having an attachment structure for external engagement; and a metal pin, the metal coupling having an aperture, wherein the metal coupling receives the peripheral engagement surface of the body and the metal pin extends into the aperture of the coupling and the recess of the shank to retain the metal coupling to the shank.

28. A fastener comprising:

a body fabricated as a unitary component from a composite, the body including a head and a shank, the shank including a peripheral engagement surface and a recess; and a metal coupling mechanically retained to the peripheral engagement surface of the shank and having an attachment structure for external engagement, wherein the attachment structure is a flange.

29. A fastener comprising:

a body fabricated as a unitary component from a composite, the body including a head and a shank, the shank including a peripheral engagement surface and a recess;

a metal coupling mechanically retained to the peripheral engagement surface of the shank and having an attachment structure for external engagement; and a spacer disposed around the shank between the head and the metal coupling.

30. A fastener comprising:

a body fabricated as a unitary component from a composite, the body including a head and a shank, the shank including a peripheral engagement surface and a recess;

a metal coupling mechanically retained to the peripheral engagement surface of the shank and having an attachment structure for external engagement; and a second metal coupling that receives the shank and has an attachment structure, wherein at least one of the attachment structures is a threaded external surface.

* * * * *